(12) United States Patent
Cheng (10) Patent No.: US 6,873,477 B1
(45) Date of Patent: Mar. 29, 2005

(54) ROTATING MECHANISM (75) Inventor: Li-Chieh Cheng, Taipei (TW)

(73) Assignee: BENQ Corporation, Taoyuan (TW)

( * ) Notice: Subject to any disclaimer, the term of this patent is extended or adjusted under 35 U.S.C. 154(b) by 0 days.

(21) Appl. No.: 10/826,828

(22) Filed: Apr. 16, 2004

(30) Foreign Application Priority Data

Oct. 22, 2003 (TW) .................................... 92129234 A (51) Int. Cl.⁷ ............................ G02B 7/02; G02B 15/14
(52) U.S. Cl. ........................................ 359/813; 359/694
(58) Field of Search ............................. 359/694, 699, 359/700, 703, 704, 813, 822

(56) References Cited

U.S. PATENT DOCUMENTS

| 5,285,322 A | * | 2/1994 | Horning et al. | ............. | 359/826 |
| 6,295,170 B1 | * | 9/2001 | Wallace et al. | ............. | 359/813 |
| 6,519,101 B2 | * | 2/2003 | Bell et al. | .................. | 359/896 |
| 2004/0099495 A1 | * | 5/2004 | Hayashi | ...................... | 188/290 |
| 2004/0141287 A1 | * | 7/2004 | Kim et al. | .................. | 361/683 |

* cited by examiner

Primary Examiner—Ricky Mack
(74) Attorney, Agent, or Firm—Quintero Law Office (57) ABSTRACT A rotating mechanism. The rotating mechanism comprises a housing, a first rotating member, a second rotating member, a restricting member and a resilient element. The housing has a curved inner wall, a first positioning portion and a limiting member. The first rotating member is rotatably disposed in the housing and has a second positioning portion. The second rotating member is rotatably disposed on the first rotating member. The restricting member abuts the limiting member and has a curved outer edge, a first end and a second end. The profile of the curved outer edge approximately corresponds to that of the curved inner wall. The first end is rotatably connected to the first rotating member. The resilient element is connected to the housing and first rotating member. The first rotating member rotates within a predetermined angle by means of the resilient element, first positioning portion and second positioning portion.

20 Claims, 10 Drawing Sheets

ROTATING MECHANISM

BACKGROUND OF THE INVENTION

1. Field of the Invention

The present invention relates to a rotating mechanism, and in particular to a rotating mechanism that generates a positive interval response.

2. Description of the Related Art

A conventional digital camera usually has a rotatable lens to capture images at different angles. Nevertheless, the lens of the conventional digital camera must be rotated by hand and not automatically. When rotating the lens, a user cannot perceive to what angle the lens has been rotated, making adjustment of the photographic angle of the conventional digital camera inconvenient. Moreover, since the lens of the conventional digital camera must be freely stopped during rotation, rubber frictional elements are disposed in the interior of the lens to provide resistance. The rubber frictional elements, however, may be damaged and decompose into powder after long use, reducing the resistance thereof. Thus, the lens of the conventional digital camera may not stop at certain angles to enable digital photography.

SUMMARY OF THE INVENTION

Thus, there is a need for a rotating mechanism providing more convenient deployment of a lens, as well as enabling users to feel the correct position of the lens. Accordingly, an object of the invention provides a rotating mechanism comprising a housing, a first rotating member, a second rotating member, a restricting member and a resilient element. The housing has a curved inner wall, a first positioning portion and a limiting member. The first rotating member is rotatably disposed in the housing and has a second positioning portion. The second rotating member is rotatably disposed on the first rotating member. The restricting member abuts the limiting member and has a curved outer edge, a first end and a second end. The profile of the curved outer edge approximately corresponds to that of the curved inner wall. The first end is rotatably connected to the first rotating member. The second end abuts the second rotating member. The resilient element is connected to the housing and first rotating member. The first rotating member rotates within a predetermined angle by means of the resilient element, first positioning portion and second positioning portion.

The second rotating member further comprises an engaging portion engaging the second end of the restricting member. The second rotating member rotates when the first rotating member rotates within the predetermined angle.

The limiting member further comprises a curved profile, approximately corresponding to that of the curved inner wall, which connects to the curved inner wall eccentrically such that the restricting member can not move backwards along the curved inner wall when abutting the limiting member.

The curved inner wall is formed with a plurality of recesses.

The rotating mechanism further comprises a central shaft disposed on the housing and surrounded by the curved inner wall. The first rotating member is rotatably disposed on the central shaft.

The second rotating member is rotatably disposed on the first rotating member and central shaft and comprises a resilient arm and a protrusion formed thereon. The resilient arm slides on the curved inner wall of the housing, and the protrusion slides on the curved inner wall and into the recesses thereof.

The restricting member is disposed on the first rotating member and adjacent to the second rotating member.

The first rotating member, the second rotating member and the restricting member rotate to the predetermined angle by means of the resilient element.

The housing further comprises a through hole, the central shaft disposed on the housing via the through hole.

The first rotating member further comprises an annular groove and the second rotating member further comprises an annular flange rotatably disposed in the annular groove.

Damping fluid is filled between the annular groove and the annular flange, enhancing resistance therebetween when the annular flange rotates in the annular groove.

The rotating mechanism further comprises a first sealing element and a second sealing element, both disposed between the first rotating member and the second rotating member to prevent leakage of the damping fluid between the annular groove and the annular flange and to enhance friction therebetween.

The first rotating member further comprises a first engaging groove and a second engaging groove and the restricting member further comprises a first end and a second end. The first end is engaged with the first engaging groove, and the second end is engaged with the second engaging groove.

The restricting member swings relatively to the first rotating member.

The housing further comprises a first connecting hole and the resilient element further comprises a first connecting end disposed in the first connecting hole.

The first rotating member further comprises a second connecting hole and the resilient element further comprises a second connecting end disposed in the second connecting hole.

The rotating mechanism further comprises a reinforcing member disposed on the central shaft and between the housing and the first rotating member to reinforce the first rotating member.

The reinforcing member further comprises a third positioning portion and the first rotating member further comprises a third engaging groove, adjacent to the second positioning portion, receiving the third positioning portion.

The rotating mechanism further comprises a first fixing member disposed between the reinforcing member and the housing to fix the housing and central shaft.

The rotating mechanism further comprises a second fixing member disposed on the second rotating member to fix the reinforcing member, first rotating member, resilient element and second rotating member.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1A:
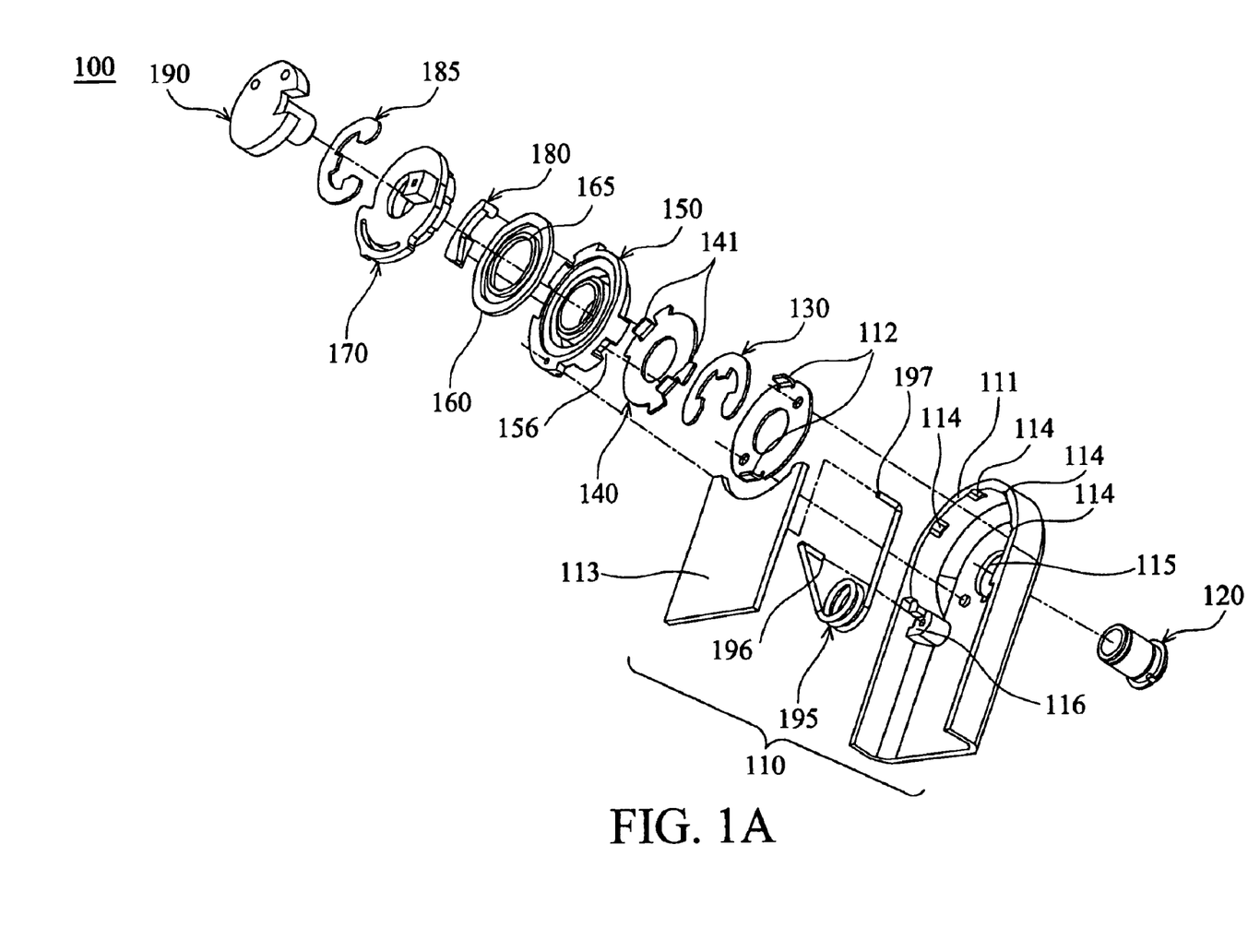
FIG. 1A is a perspective exploded view of the rotating mechanism of the invention.
Figure 1B:
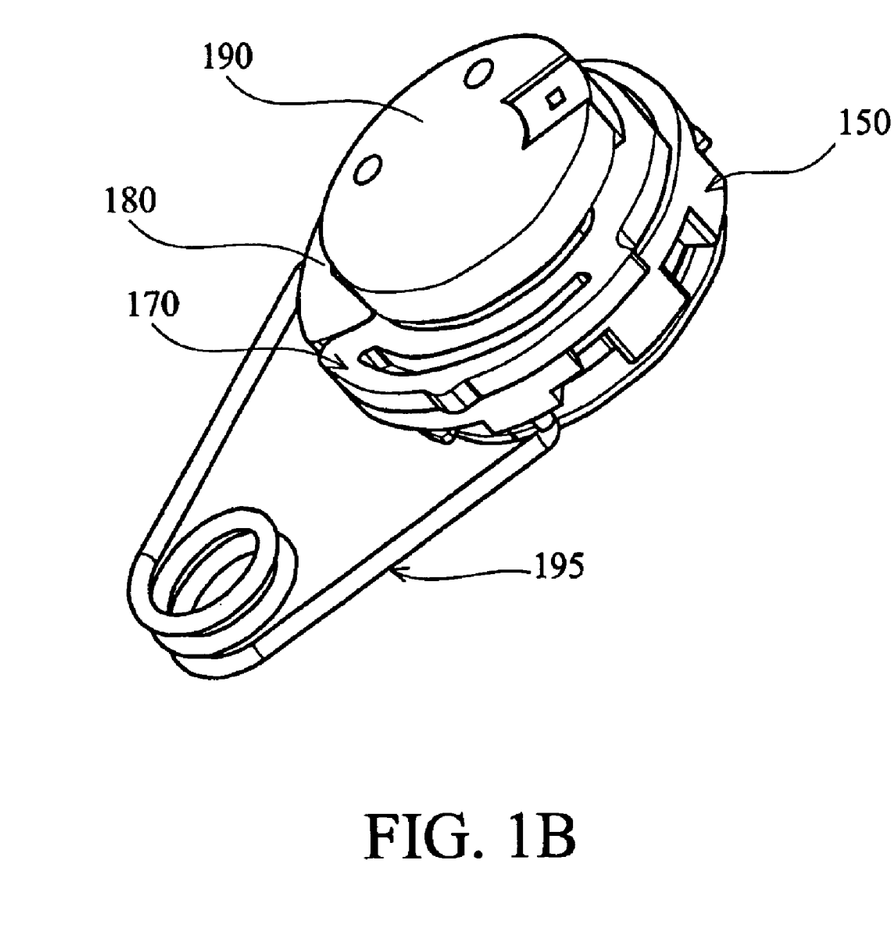
FIG. 1B is a partial perspective assembly view of the rotating mechanism of the invention.

Referring to FIG. 1A and FIG. 1B, the rotating mechanism 100 comprises a housing 110, a central shaft 120, a first fixing member 130, a reinforcing member 140, a first rotating member 150, a first sealing member 160, a second sealing member 165, a second rotating member 170, a restricting member 180, a second fixing member 185, a coupling 190 and a resilient element 195.

Figure 2:
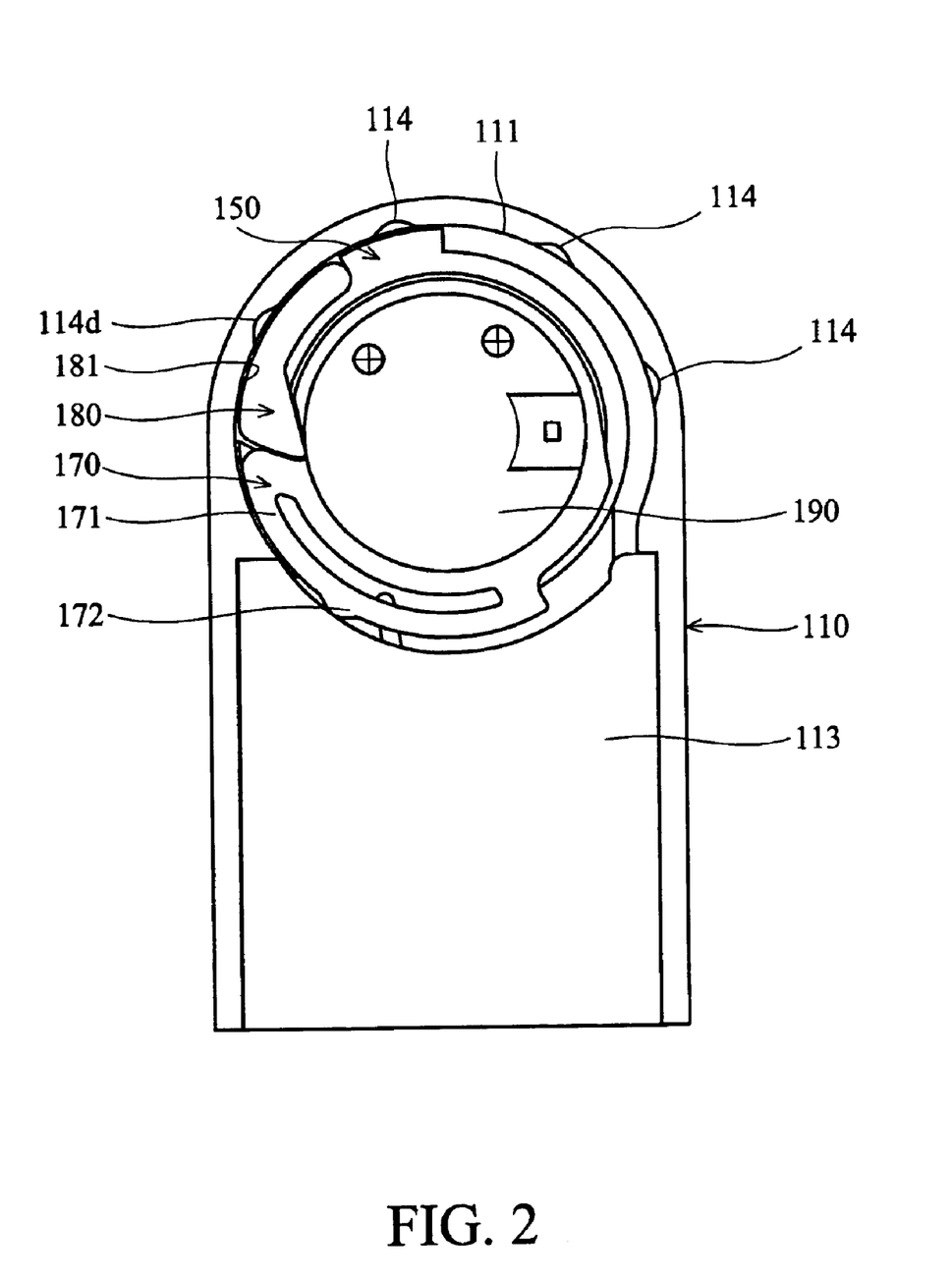
FIG. 2 is a plane assembly view of the rotating mechanism of the invention.

As shown in FIG. 1A and FIG. 2, the housing 110 has a curved inner wall 111, two first positioning portions 112 and a limiting member 113. A plurality of recesses 114 is equidistantly formed on the curved inner wall 111. The recesses 114 define the rotated angles of 135°, 180°, 225° and 270°, respectively. The limiting member 113 has a curved profile approximately corresponds to that of the curved inner wall 111 and connected to the curved inner wall 111. Specifically, the position of the center of the curved profile is different from that of the curved inner wall 111. Additionally, the housing 110 has a through hole 115 and a first connecting hole 116. As shown in FIG. 1A, the through hole 115 is formed on the center of the curved inner wall 111.

The central shaft 120 is disposed on the housing 110 via the through hole 115 thereof and is surrounded by the curved inner wall 111 thereof.

Also, the first fixing member 130 is disposed on the housing 110 to fix the housing 110 and central shaft 120.

Figure 3A:
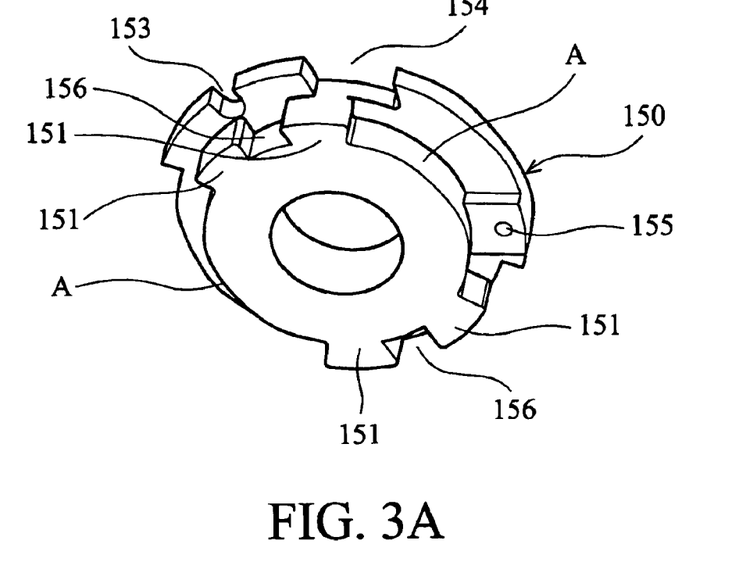
FIG. 3A is a bottom perspective view of the first rotating member of the rotating mechanism of the invention.
Figure 3B:
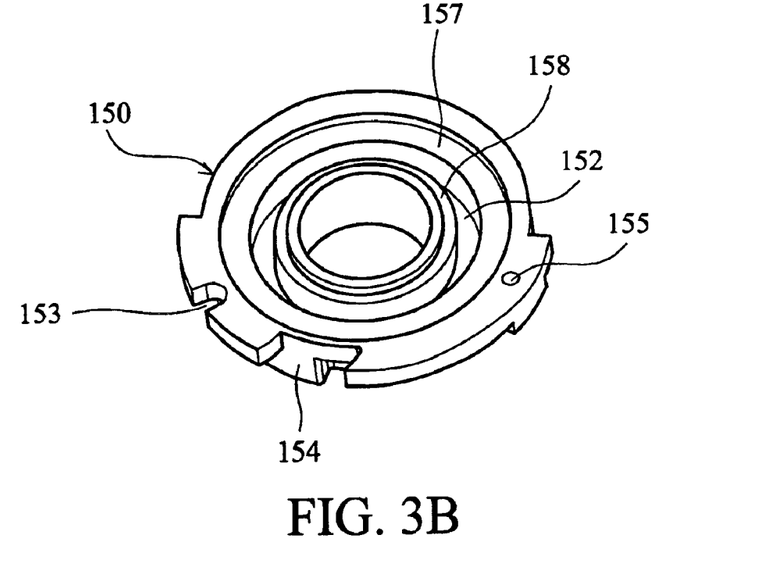
FIG. 3B is a top perspective view of the first rotating member of the rotating mechanism of the invention.

Referring to FIG. 3A and FIG. 3B, the first rotating member 150 can be made of rubber and is rotatably disposed in the housing 110 and on the central shaft 120. The first rotating member 150 has a plurality of second positioning portions 151, an annular groove 152, a first engaging groove 153, a second engaging groove 154, a second connecting hole 155 and two third engaging grooves 156. Each of the third engaging grooves 156 is adjacent to the second positioning portions 151. Namely, each third engaging groove 156 is adjacent to two second positioning portions 151. As shown in FIG. 3A, the first rotating member 150 further comprises two curved sliding portions A. Each curved sliding portion A is between the two second positioning portions 151 and slides between the two first positioning portions 112 of the housing 110. Specifically, the curved length of the curved sliding portions A defines a rotated angle of 90°, as is discussed in the later description.

The reinforcing member 140 is disposed between the housing 110 and the first rotating member 150. The profile of the reinforcing member 140 approximately corresponds to that of the first rotating member 150 such that the reinforcing member 140 can be attached thereto. Specifically, in this embodiment, the reinforcing member 140 has two third positioning portions 141 respectively engaging the third engaging grooves 156 of the first rotating member 150, reinforcing the first rotating member 150.

Figure 4A:
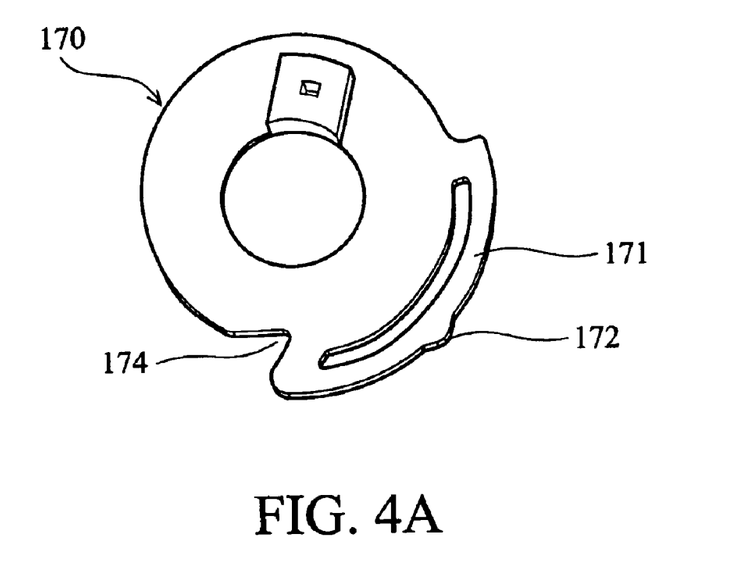
FIG. 4A is a top perspective view of the second rotating member of the rotating mechanism of the invention.
Figure 4B:
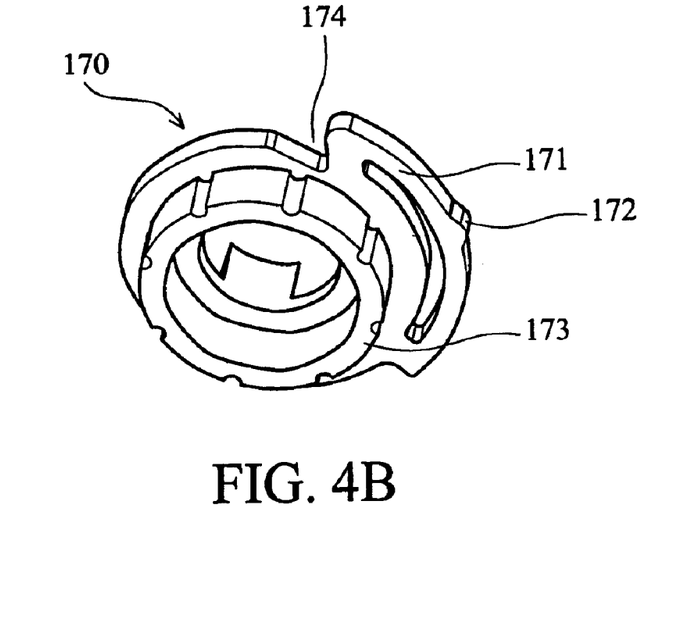
FIG. 4B is a bottom perspective view of the second rotating member of the rotating mechanism of the invention.
Figure 5A:
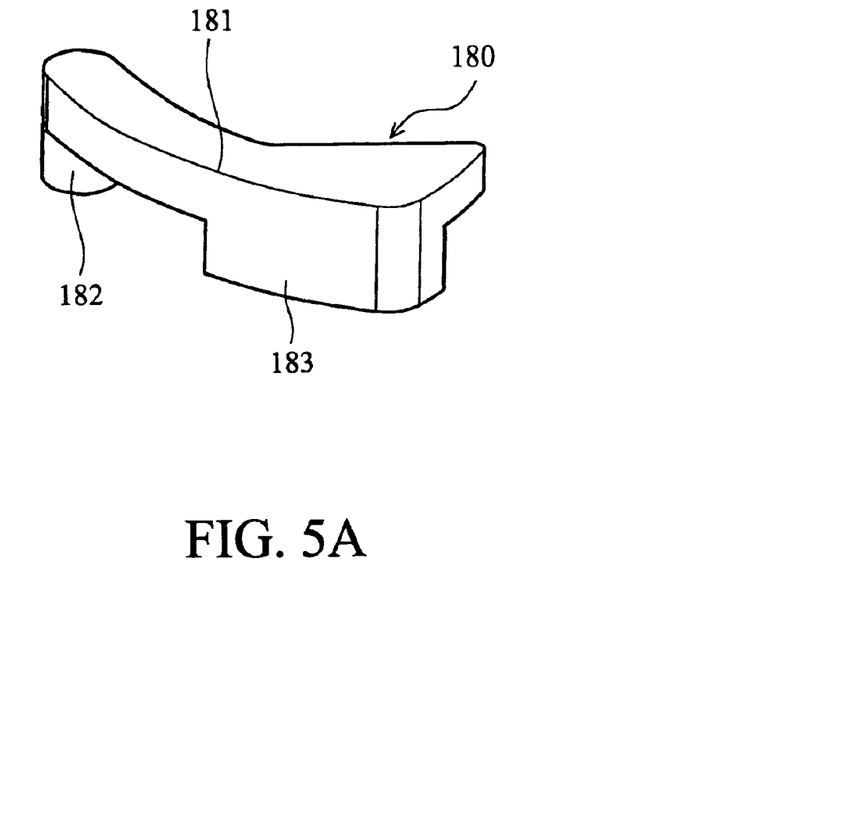
FIG. 5A is a top perspective view of the restricting member of the rotating mechanism of the invention.
Figure 5B:
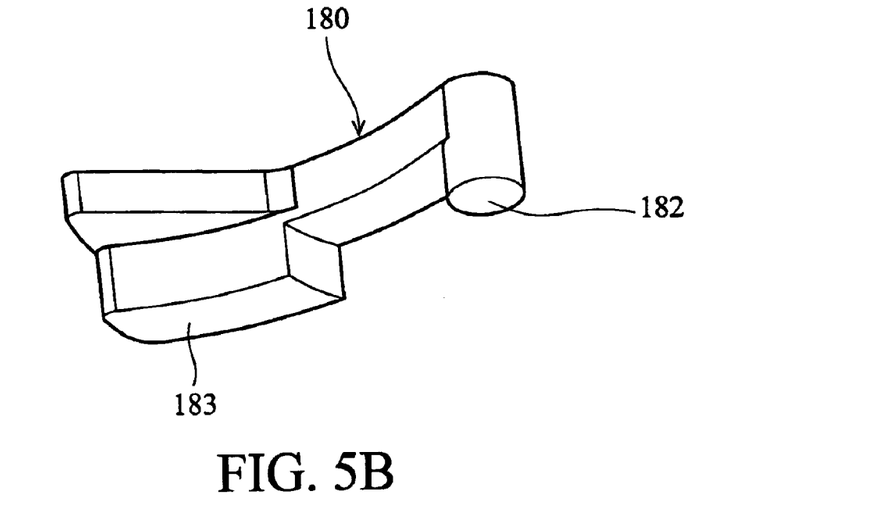
FIG. 5B is a bottom perspective view of the restricting member of the rotating mechanism of the invention.

Referring to FIG. 4A and FIG. 4B, the second rotating member 170 can be made of rubber and is rotatably disposed on the first rotating member 150 and central shaft 120. Additionally, the second rotating member 170 has a resilient arm 171, a protrusion 172, an annular flange 173 and an engaging portion 174. The protrusion 172 is formed on the resilient arm 171. As shown in FIGS. 7B to 7F, the protrusion 172 can slide on the curved inner wall 111 and into the recesses 114 thereof. As shown in FIGS. 1A, 3B and 4B, the annular flange 173 of the second rotating member 170 is rotatably disposed in the annular groove 152 of the first rotating member 150.

Specifically, damping fluid can be filled between the annular groove 152 of the first rotating member 150 and the annular flange 173 of the second rotating member 170, enhancing resistance therebetween when the first rotating member 150 rotates relatively to the second rotating member 170.

As shown in FIG. 1A, the first sealing member 160 and second sealing member 165 are annular and rubber and are disposed between the first rotating member 150 and the second rotating member 170. Specifically, the first sealing member 160 is disposed on an annular portion 157 of the first rotating member 150 while the second sealing member 165 is disposed on an annular portion 158 thereof, as shown in FIG. 1A and FIG. 3B. The first sealing member 160 and second sealing member 165 prevent leakage of the damping fluid between the annular groove 152 of the first rotating member 150 and the annular flange 173 of the second rotating member 170 and enhance friction (resistance) therebetween.

As shown in FIGS. 1A, 3A, 3B, 5A and 5B, the restricting member 180 is disposed on the first rotating member 150 and is adjacent to the second rotating member 170. The restricting member 180 has a curved outer edge 181, a first end 182 and a second end 183. The profile of the curved outer edge 181 approximates that of the curved inner wall 111 of the housing 110 and abuts the limiting member 113 thereof. The first end 182 is rotatably connected to the first rotating member 150, and the second end 183 abuts the second rotating member 170. Specifically, the first end 182 of the restricting member 180 engages the first engaging groove 153 of the first rotating member 150; the second end 183 engages the second engaging groove 154 and engaging portion 174 of the second rotating member 170. Accordingly, the restricting member 180, pivoting the first end 182 and first engaging groove 153, can swing relatively to the first rotating member 150 and rotate the second rotating member 170 when the first rotating member 150 rotates within a predetermined angle.

Figure 6:
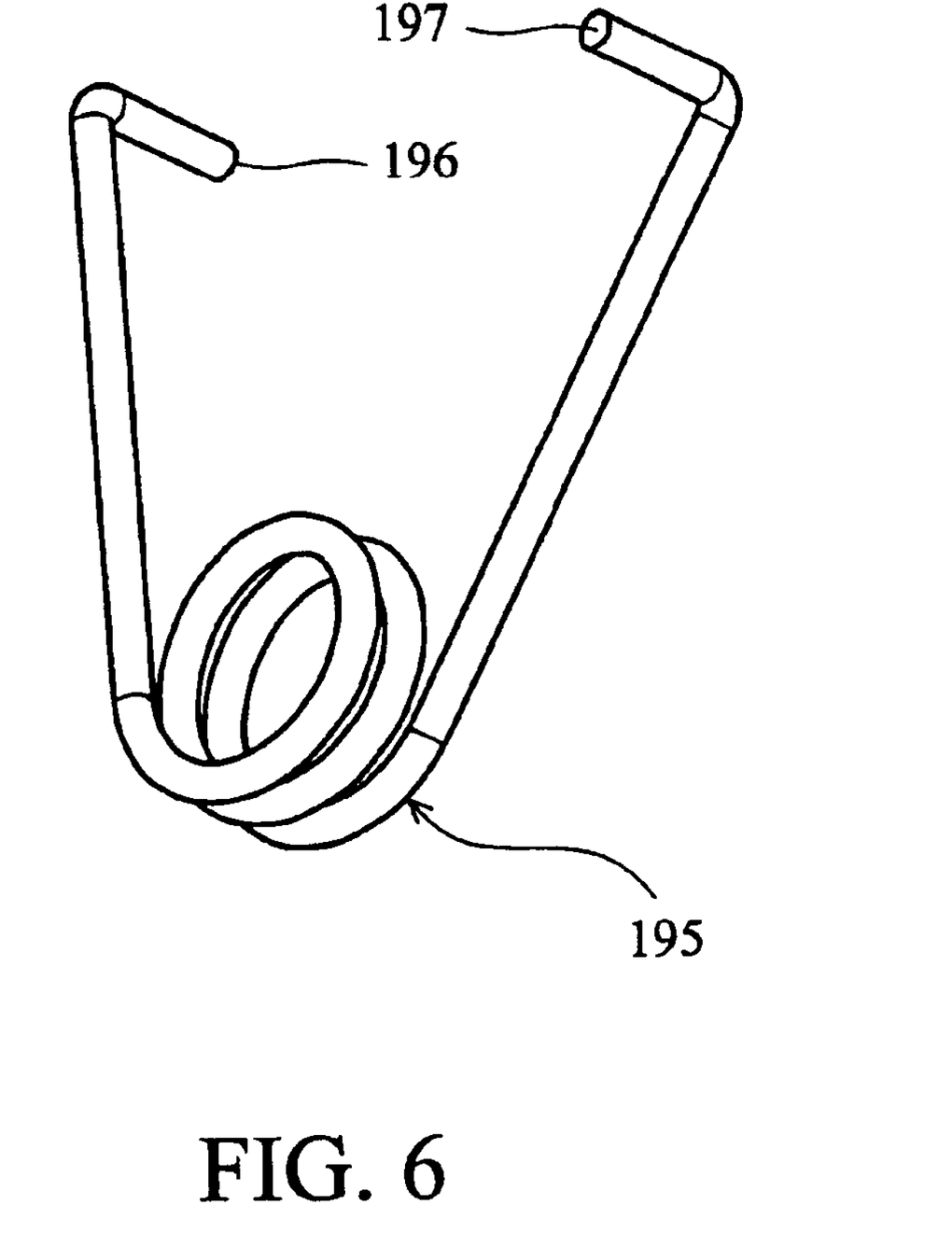
FIG. 6 is a perspective view of the resilient element of the rotating mechanism of the invention.

As shown in FIG. 1A, the resilient element 195 is connected to the housing 110 and first rotating member 150. The first rotating member 150 is rotated by spring of the resilient element 195. The first positioning portions 112 of the housing 110 restrict the second positioning portions 151 of the first rotating member 150. The rotation of the first rotating member 150 is thereby confined to a predetermined angle. Namely, first rotating member 150, second rotating member 170 and restricting member 180 are rotated within the predetermined angle by means of the resilient element 195. Additionally, as shown in FIG. 6, the resilient element 195 has a first connecting end 196 and a second connecting end 197. The first connecting end 196 is disposed in the first connecting hole 116 of the housing 110 while the second connecting end 197 is disposed in the second connecting hole 155 of the first rotating member 150. In this embodiment, the resilient element 195 is a torsion spring.

The second fixing member 185 is disposed on the second rotating member 170 to fix the reinforcing member 140, first rotating member 150, resilient element 195 and second rotating member 170.

The coupling 190 is disposed on the second rotating member 170 and is connected to the central shaft 120.

The following description is directed to the operation of the rotating mechanism 100.

Figure 7A:
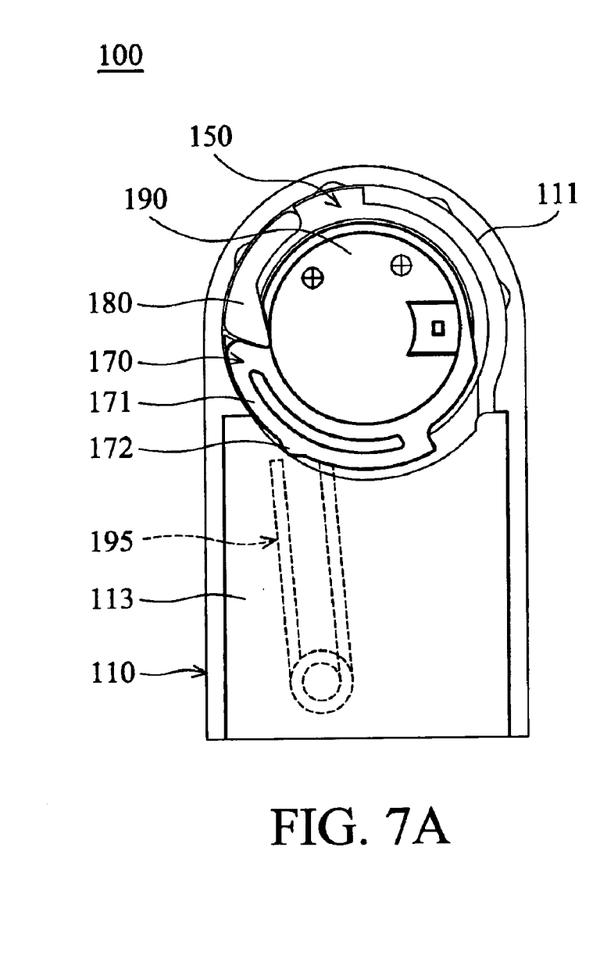
FIG. 7A is a schematic plane view of the first operating mode of the rotating mechanism of the invention.

The rotating mechanism 100 is disposed on a digital camera and connects a lens (not shown). The lens is connected to the coupling 190 of the rotating mechanism 100. As shown in FIG. 7A, when the rotating mechanism 100 is not activated, the resilient element 195 is compressed and the remaining members of the rotating mechanism 100 thereby maintain their position.

Figure 7B:
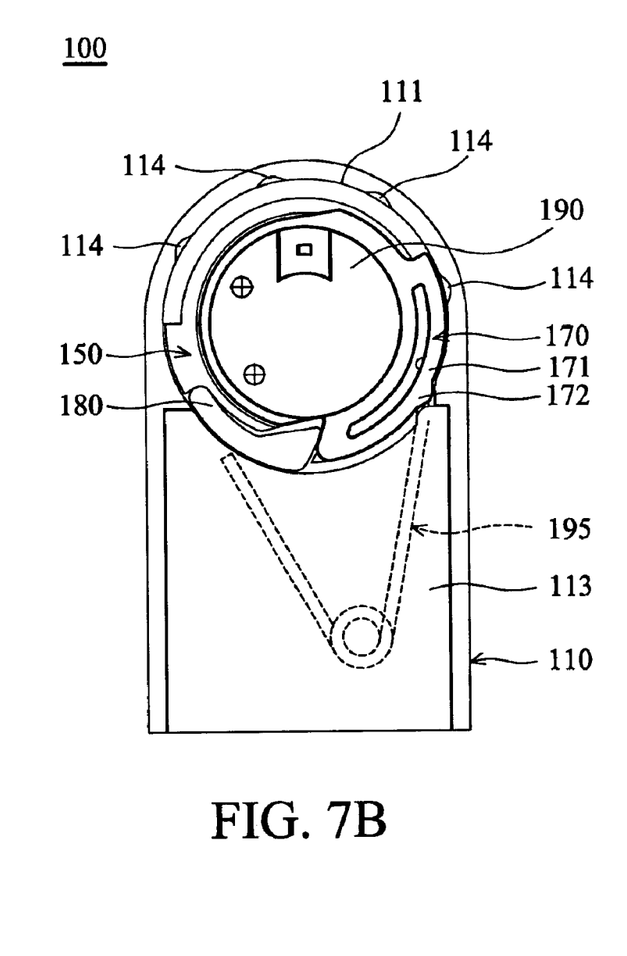
FIG. 7B is a schematic plane view of the second operating mode of the rotating mechanism of the invention.

As shown in FIG. 7A and FIG. 7B, when a switch (not shown) of the digital camera is actuated, the resilient element 195 expands by its own resilience. Since the first connecting end 196 of the resilient element 195 is disposed in the first connecting hole 116 of the housing 110 and the second connecting end 197 thereof is disposed in the second connecting hole 155 of the first rotating member 150, the expanded resilient element 195 rotates all the members (except the housing 110, central shaft 120 and first fixing member 130) of the rotating mechanism 100 around the central shaft 120. At this point, the curved sliding portions A of the first rotating member 150 respectively slide between the first positioning portions 112 of the housing 110. Because the second positioning portions 151 of the first rotating member 150 are constrained by the positioning portions 112 of the housing 110, the rotating mechanism 100 (except the housing 110, central shaft 120 and first fixing member 130) does not continue to rotate by means of the resilient element 195 after having rotated to the predetermined angle. Namely, the lens connected to the rotating mechanism 100 springs out to the predetermined angle. Specifically, the predetermined angle is 90°.

Figure 7C:
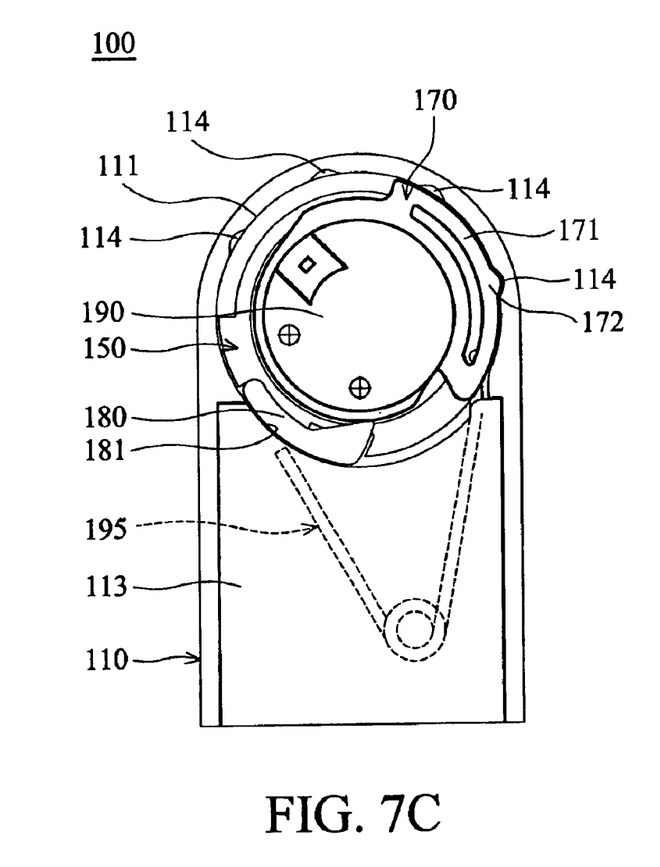
FIG. 7C is a schematic plane view of the third operating mode of the rotating mechanism of the invention.

The lens can then be pushed to rotate the second rotating member 170 connected to the lens (coupling 190) while the first rotating member 150 is not rotated. Specifically, the restricting member 180 is abutted between the second rotating member 170 and the limiting member 113. Additionally, since the damping fluid is filled between the first rotating member 150 and the second rotating member 170 with first sealing member 160 and second sealing member 165 disposed therebetween, a resistance is generated when the second rotating member 170 rotates relatively to the first rotating member 150. At this moment, the protrusion 172 of the resilient arm 171 of the second rotating member 170 slides on the curved inner wall 111. The resilient arm 171 thereby provides resilience to the curved inner wall 111. The second rotating member 170 or lens can stop by way of the resistance provided by the resilient arm 171 and curved inner wall 111. Namely, the second rotating member 170 (or lens) can stop at any angle according to user requirement. When the second rotating member 170 continues to rotate until the protrusion 172 thereof slides onto the first recess 114 of the curved inner wall 111, the protrusion 172 is immediately engaged with the first recess 114, as shown in FIG. 7C. At this point, user can feel the lens position into a specific angle such as 135°, 180°, 225° or 270°, according to the design of the protrusions 172 and the recesses 114.

Specifically, after the second rotating member 170 rotates beyond 90°, the restricting member 180 is engaged between the second rotating member 170 and the limiting member 113. The curved profile of the limiting member 113 is connected eccentrically to the curved inner wall 111. Accordingly, when the second rotating member 170 or lens rotates reversely, the restricting member 180 cannot reverse along the curved inner wall 111. The first rotating member 150 connected to the restricting member 180 thereby cannot rotate reversely. Accordingly, relative rotation between the second rotating member 170 and the first rotating member 150 is effective.

Figure 7D:
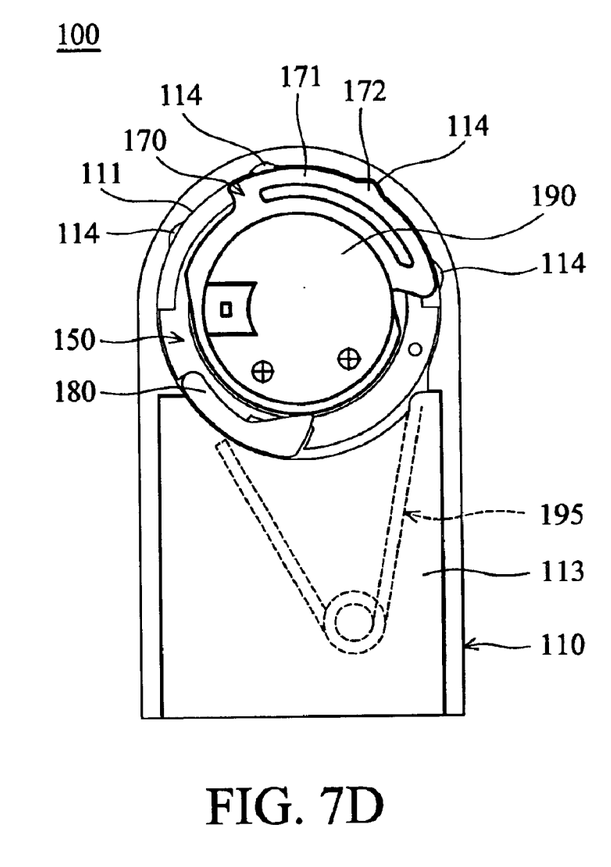
FIG. 7D is a schematic plane view of the fourth operating mode of the rotating mechanism of the invention.
Figure 7E:
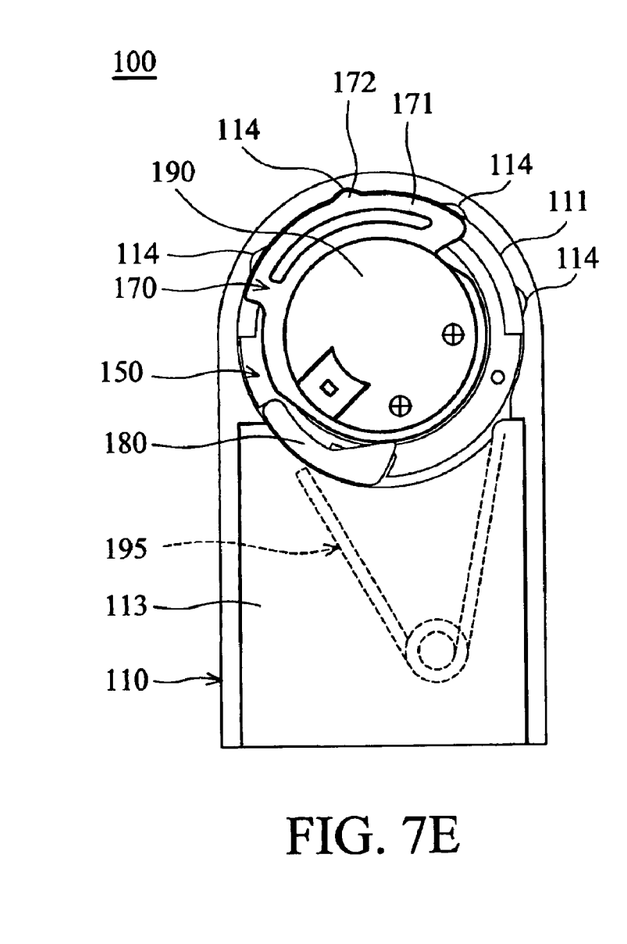
FIG. 7E is a schematic plane view of the fifth operating mode of the rotating mechanism of the invention.
Figure 7F:
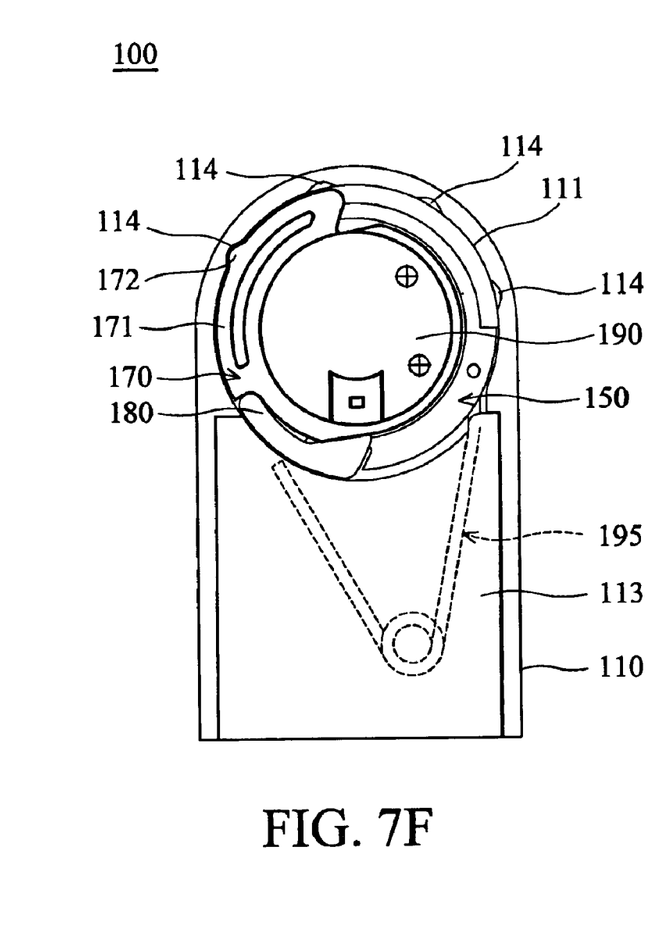
FIG. 7F is a schematic plane view of the sixth operating mode of the rotating mechanism of the invention.

When the second rotating member 170 (or lens) continues to rotate, the protrusion 172 thereof engages the following recesses 114 in sequence. As shown in FIGS. 7D, 7E and 7F, the corresponding rotated angles of the second rotating member 170 are 180°, 225° and 270°, respectively. Specifically, when the corresponding rotated angle of the second rotating member 170 (or lens) is 270°, the digital camera can perform self-photography and the second rotating member 170 will no longer rotate forward due to constraint of the restricting member 180. Additionally, when the second rotating member 170 (or lens) rotates reversely from 90° to 0°, the resilient element 195 exerts resilience thereon. At this point, it is required to exert greater force to rotate the second rotating member 170 (or lens) back to the initial position (as shown in FIG. 7A).

In conclusion, the lens of the digital camera can be smoothly spring out from 0° to 90° by employing the rotating mechanism 100; meanwhile, user can have a resistance feel and a multi-section feel according to the is design of the protrusions 172 and the recesses 114 during rotation from 90° to 270°.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A rotating mechanism, comprising:
   a housing, with a curved inner wall, a first positioning portion and a limiting member;
   a first rotating member rotatably disposed in the housing, with a second positioning portion;
   a second rotating member rotatably disposed on the first rotating member;
   a restricting member abutting the limiting member, with a curved outer edge, a first end and a second end, the profile of the curved outer edge approximately corresponding to that of the curved inner wall, the first end rotatably connected to the first rotating member, and the second end abutting the second rotating member; and a resilient element connected to the housing and the first rotating member, wherein the first rotating member rotates within a predetermined angle by means of the resilient element, the first positioning portion and the second positioning portion.

2. The rotating mechanism as claimed in claim 1, wherein the second rotating member further comprises an engaging portion engaging the second end of the restricting member, the second rotating member rotating when the first rotating member rotates within the predetermined angle.

3. The rotating mechanism as claimed in claim 1, wherein the limiting member further comprises a curved profile, approximately corresponding to that of the curved inner wall, which connects to the curved inner wall eccentrically such that the restricting member can not move backwards along the curved inner wall when abutting the limiting member.

4. The rotating mechanism as claimed in claim 1, wherein the curved inner wall is formed with a plurality of recesses.

5. The rotating mechanism as claimed in claim 4, further comprising a central shaft disposed on the housing and surrounded by the curved inner wall, wherein the first rotating member is rotatably disposed on the central shaft.

6. The rotating mechanism as claimed in claim 5, wherein the second rotating member, rotatably disposed on the first rotating member and the central shaft, comprises a resilient arm and a protrusion formed thereon, the resilient arm sliding on the curved inner wall of the housing, and the protrusion sliding on the curved inner wall and into the recesses thereof.

7. The rotating mechanism as claimed in claim 5, wherein the housing further comprises a through hole, the central shaft disposed on the housing via the through hole.

8. The rotating mechanism as claimed in claim 5, further comprising a reinforcing member disposed on the central shaft and between the housing and the first rotating member to reinforce the first rotating member.

9. The rotating mechanism as claimed in claim 8, wherein the reinforcing member further comprises a third positioning portion and the first rotating member further comprises a third engaging groove, adjacent to the second positioning portion, receiving the third positioning portion.

10. The rotating mechanism as claimed in claim 8, further comprising a first fixing member disposed between the reinforcing member and the housing to fix the housing and central shaft.

11. The rotating mechanism as claimed in claim 8, further comprising a second fixing member disposed on the second rotating member to fix the reinforcing member, first rotating member, resilient element and second rotating member.

12. The rotating mechanism as claimed in claim 1, wherein the restricting member is disposed on the first rotating member and is adjacent to the second rotating member.

13. The rotating mechanism as claimed in claim 1, wherein the first rotating member, the second rotating member and the restricting member rotate to the predetermined angle by means of the resilient element.

14. The rotating mechanism as claimed in claim 1, wherein the first rotating member further comprises an annular groove and the second rotating member further comprises an annular flange rotatably disposed in the annular groove.

15. The rotating mechanism as claimed in claim 14, wherein damping fluid is filled between the annular groove and the annular flange, enhancing resistance therebetween when the annular flange rotates in the annular groove.

16. The rotating mechanism as claimed in claim 15, further comprising a first sealing element and a second sealing element, both disposed between the first rotating member and the second rotating member to prevent leakage of the damping fluid between the annular groove and the annular flange and to enhance friction therebetween.

17. The rotating mechanism as claimed in claim 1, wherein the first rotating member further comprises a first engaging groove and a second engaging groove and the restricting member further comprises a first end and a second end, the first end engaged with the first engaging groove, and the second end engaged with the second engaging groove.

18. The rotating mechanism as claimed in claim 17, wherein the restricting member swings relatively to the first rotating member.

19. The rotating mechanism as claimed in claim 1, wherein the housing further comprises a first connecting hole and the resilient element further comprises a first connecting end disposed in the first connecting hole.

20. The rotating mechanism as claimed in claim 1, wherein the first rotating member further comprises a second connecting hole and the resilient element further comprises a second connecting end disposed in the second connecting hole.

* * * * *